US011341966B2

(12) United States Patent
Shin

(10) Patent No.: US 11,341,966 B2
(45) Date of Patent: May 24, 2022

(54) OUTPUT FOR IMPROVING INFORMATION DELIVERY CORRESPONDING TO VOICE REQUEST

(71) Applicants: NAVER CORPORATION, Seongnam-si (KR); LINE CORPORATION, Tokyo (JP)

(72) Inventor: Myeongsoo Shin, Seongnam-si (KR)

(73) Assignees: NAVER CORPORATION, Seongnam-si (KR); LINE CORPORATION, Tokyo (JP)

( * ) Notice: Subject to any disclaimer, the term of this patent is extended or adjusted under 35 U.S.C. 154(b) by 139 days.

(21) Appl. No.: 16/694,359

(22) Filed: Nov. 25, 2019

(65) Prior Publication Data

US 2020/0098367 A1  Mar. 26, 2020

Related U.S. Application Data

(63) Continuation of application No. PCT/KR2018/004919, filed on Apr. 27, 2018.

(30) Foreign Application Priority Data

May 24, 2017 (KR) .................. 10-2017-0063982

(51) Int. Cl.
*G10L 15/00* (2013.01)
*G10L 15/22* (2006.01)
*G10L 13/02* (2013.01)

(52) U.S. Cl.
CPC .............. *G10L 15/22* (2013.01); *G10L 13/02* (2013.01); *G10L 2015/223* (2013.01)

(58) Field of Classification Search
CPC .................................. G06F 3/167; G10L 15/22
See application file for complete search history.

(56) References Cited

U.S. PATENT DOCUMENTS 9,318,006 B2    4/2016  Heubel et al.
2003/0167172 A1*  9/2003  Johnson .............. H04M 3/4938
                                                              704/270.1
(Continued)

FOREIGN PATENT DOCUMENTS

JP    2004234273 A    8/2004
JP    2007155602 A    6/2007
(Continued)

OTHER PUBLICATIONS

Office Action issued in corresponding Japanese patent application No. 2018-94709, dated Mar. 23, 2021.
(Continued)

*Primary Examiner* — Daniel Abebe
(74) *Attorney, Agent, or Firm* — Greer Burns & Crain Ltd.

(57) ABSTRACT

An output technology for improving information delivery corresponding to a voice request is provided. In one embodiment, a method by which an electronic device comprising a voice-based interface provides information comprises the steps of: receiving a voice request from a user through the voice-based interface; acquiring response information corresponding to the voice request; outputting the response information in a reply voice, which is an auditory output form, through at least one medium among a plurality of media including a main medium corresponding to the voice-based interface and a sub medium included in other electronic devices linkable with the electronic device; and providing other outputs for at least a part of the response information through at least one medium, which is the same as or different from the medium through which the reply voice is being outputted, among the plurality of media.

21 Claims, 9 Drawing Sheets

(56) References Cited

U.S. PATENT DOCUMENTS

| | | | | |
|---|---|---|---|---|
| 2003/0182125 A1* | 9/2003 | Phillips | .................. | H04L 12/66 704/270.1 |
| 2007/0032193 A1* | 2/2007 | Wada | ................ | H04M 1/72412 455/41.2 |
| 2007/0273480 A1* | 11/2007 | Burkman | ................ | H04L 67/24 340/7.52 |
| 2014/0278438 A1* | 9/2014 | Hart | ........................ | G06F 3/167 704/275 |
| 2016/0365088 A1* | 12/2016 | Liang | ..................... | G06F 3/016 |

FOREIGN PATENT DOCUMENTS

| | | |
|---|---|---|
| JP | 2007226642 A | 9/2007 |
| JP | 2008256420 A | 10/2008 |
| JP | 2013510350 A | 3/2013 |
| JP | 2016519805 A | 7/2016 |
| JP | 2016181047 A | 10/2016 |
| KR | 1020110139797 A | 12/2011 |
| WO | 2016100139 A1 | 6/2016 |
| WO | 2016158792 A1 | 10/2016 |

OTHER PUBLICATIONS

Japanese Office Action dated Dec. 24, 2019 by the Japanese Patent Office corresponding to Japanese patent application No. 2018-94709.

ISR issued in Int'l. App. No. PCT/KR2018/004919, dated Aug. 10, 2018.

* cited by examiner

FIG. 7

| Device | Position | Output media | Details | Information type |
|---|---|---|---|---|
| Electronic device A | Living room | Speaker | Main media | Auditory output |
| | | Display1 | Model name | Visual output |
| | Living room | Speaker | Model name | Auditory output |
| | | Application1 | Map application | Place, position, traffic ... |
| | | Application2 | Schedule application | Schedule, date... |
| Electronic device B | Guest room | Display2 | Model name | Visual output |
| Electronic device C | Main room | Display3 | Model name | Visual output |
| Electronic device D | Kitchen | Display4 | Model name | Visual output |
| | | Application3 | Search application | Search |
| ... | ... | ... | ... | |

OUTPUT FOR IMPROVING INFORMATION DELIVERY CORRESPONDING TO VOICE REQUEST

CROSS-REFERENCE TO RELATED APPLICATIONS

This is a continuation application of International Application No. PCT/KR2018/004919, filed Apr. 27, 2018, which claims benefit of Korean Patent Application No. 10-2017-0063982, filed May 24, 2017.

BACKGROUND OF THE INVENTION

Field of Invention

Example embodiments of the following description relate to technology for information delivery corresponding to a voice request, and more particularly, to an information providing method and system for providing another output for improving an information delivery capability in providing response information corresponding to a voice request, a computer program stored in a non-transitory computer-readable storage medium to implement the information providing method on a computer in conjunction with the computer, and the non-transitory computer-readable storage medium.

Description of Related Art

An interface operating based on voice, such as an artificial intelligence (AI) speaker of a home network service, may receive a voice request of a user through a microphone, may synthesize an answering voice to provide response information corresponding to the voice request, and may provide the same through a speaker or may output audio of content included in the response information.

For example, Korean Patent Laid-Open Publication No. 10-2011-0139797 (published on Dec. 30, 2011) relates to technology for a home media device and a home network system and method using the same and accordingly, describes technology that provides a home network service using a second communication network such as wireless fidelity (WiFi) in addition to a mobile communication network in the home network service and enables a user to perform a multiple-control on a plurality of home multimedia devices through a voice command without separately manipulating a button.

In such related arts, since only a simple answering voice is output at a time of providing response information corresponding to a voice request, there are some constraints in information delivery due to a consistent and limited information output scheme.

BRIEF SUMMARY OF THE INVENTION

One or more example embodiments provide an information providing method and an information providing system that may manage information about a plurality of pieces of media, such as a main medium corresponding to a voice-based interface included in an electronic device, such as an artificial intelligence (AI) speaker, and a sub medium (e.g., an output device included in a smartphone, an Internet protocol television (IPTV), a lighting, a smart refrigerator, etc.) included in another electronic device interacting with the electronic device and may provide another output capable of emphasizing an answering voice according to response information and an answering voice through at least one piece of media among a plurality of pieces of media based on response information corresponding to a voice request received through the voice-based interface, a computer program stored in a non-transitory computer-readable storage medium to implement an information providing method on a computer in conjunction with the computer, and the non-transitory computer-readable storage medium.

According to an aspect of at least one example embodiment, there is provided an information providing method of an electronic device comprising a voice-based interface, the method comprising receiving a voice request from a user through the voice-based interface; acquiring response information corresponding to the voice request; outputting the response information in answering voice that is an auditory output form through at least one of a plurality of pieces of media comprising a main medium corresponding to the voice-based interface and a sub medium included in another electronic device interactable with the electronic device; and providing another output with respect to at least a portion of the response information through at least one piece of media identical to or different from the media through which the answering voice is output among the plurality of pieces of media.

According to an aspect of at least one example embodiment, there is provided a computer program stored in a non-transitory computer-readable storage medium to implement the information providing method on a computer in conjunction with the computer.

According to an aspect of at least one example embodiment, there is provided a non-transitory computer-readable recording medium storing a program to implement the information providing method on a computer.

According to an aspect of at least one example embodiment, there is provided an electronic device comprising a voice-based interface; and at least one processor configured to execute a computer-readable instruction. The at least one processor is configured to receive a voice request from a user through the voice-based interface, acquire response information corresponding to the voice request, output the response information in an answering voice that is an auditory output form through at least one of a plurality of pieces of media comprising a main medium corresponding to the voice-based interface and a sub medium included in another electronic device interactable with the electronic device, and provide another output with respect to at least a portion of the response information through at least one piece of media identical to or different from the media through which the answering voice is output among the plurality of pieces of media.

According to some example embodiments, by managing information about a plurality of pieces of media, such as a main medium corresponding to a voice-based interface included in an electronic device, such as an artificial intelligence (AI) speaker, and a sub medium (e.g., an output device included in a smartphone, an Internet protocol television (IPTV), a lighting, a smart refrigerator, etc.) included in another electronic device interacting with the electronic device and by providing an answering voice according to response information and another output capable of emphasizing the answering voice through at least one piece of media among a plurality of pieces of media based on response information corresponding to a voice request received through the voice-based interface, it is possible to improve the information delivery capability of the response information corresponding to the voice request through an adaptive and expanded information output method.

BRIEF DESCRIPTION OF DRAWINGS

FIG. 7 illustrates an example of information about media according to an example embodiment.

DETAILED DESCRIPTION OF THE INVENTION

Figure 1:
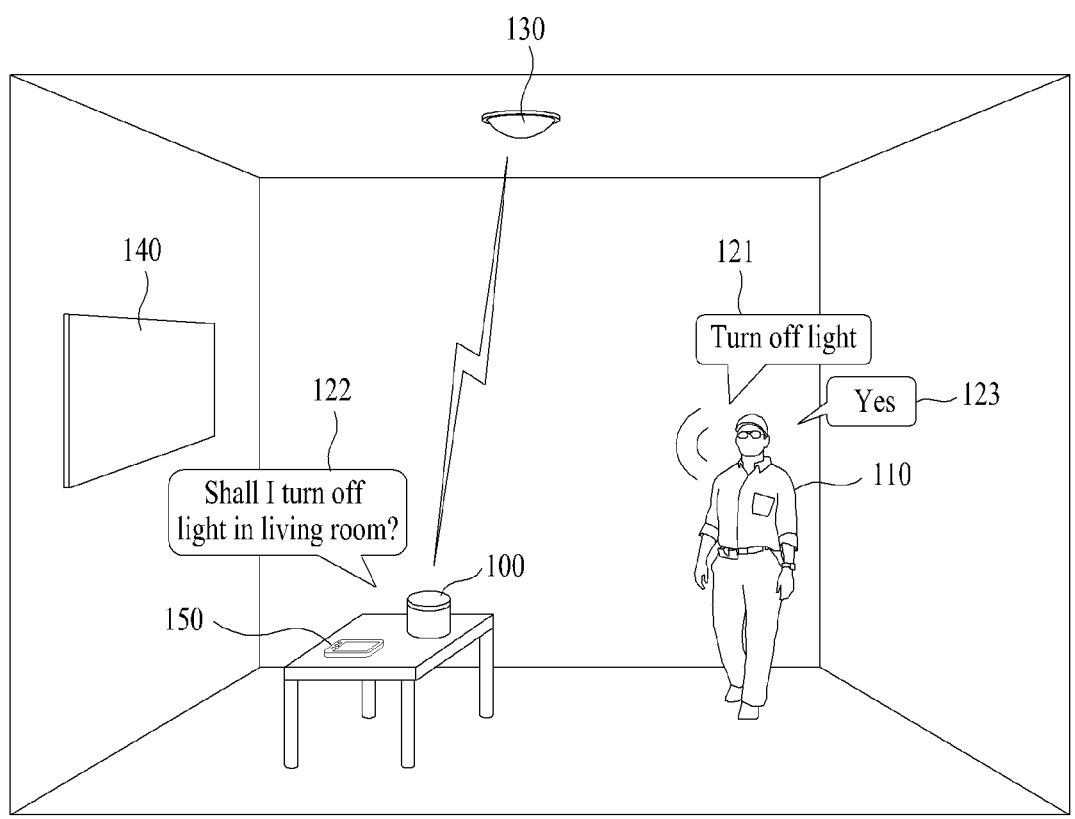
FIG. 1 illustrates an example of a service environment using a voice-based interface according to an example embodiment.

Hereinafter, example embodiments will be described with reference to the accompanying drawings. An information providing system according to example embodiments may be configured through an electronic device providing an interface that operates based on voice. The electronic device may generate response information by directly processing such a voice request or may process the voice request by recognizing and analyzing the voice request through an external platform connected using a separate interface connection. For example, the external platform may include a cloud artificial intelligence (AI) platform configured to receive a voice request of a user from the electronic device, to analyze the received voice request, and to generate a query suitable for intent of the user or response information corresponding to the query. Here, the electronic device may select at least one piece of media for outputting response information corresponding to the voice request. The media may include a main medium corresponding to a voice-based interface included in the electronic device and a sub medium included in another electronic device capable of outputting information through interaction with the electronic device. For example, the sub medium may correspond to an output device, for example, a display, included in the other electronic device or a specific application installed on the other electronic device. In detail, the electronic device may output an answering voice corresponding to the response information and may also provide another output capable of synchronizing with the answering voice and emphasizing the answering voice. Here, the answering voice and the other output may be provided through the same media or may be provided through different media. For example, a case in which information about "fine dust" is acquired as response information in response to a voice request of a user saying "how's the weather?" may be considered. Here, the answering voice about "fine dust" may be auditorily output through the voice-based interface included in the electronic device. Also, another output for emphasizing the answering voice about "fine dust" may be visually output through a display of the other electronic device interacting with the electronic device. Further, the other output associated with the answering voice about "fine dust" may output background music (BGM) through interaction with an audio application of the other electronic device. It will be easily understood by those skilled in the art that such an application may include not only the audio application but also various types of existing applications, such as, for example, a virtual reality (VR) related application, a map application, a search application, a game application, a messenger application, a store application, etc.

An information providing method according to example embodiments may be performed by the aforementioned electronic device. Here, a computer program according to an example embodiment may be installed and executed on the electronic device, and the electronic device may perform the information providing method under control of the executed computer program. The aforementioned computer program may be stored in a non-transitory computer-readable storage medium to implement the information providing method on a computer in conjunction with the electronic device configured as the computer.

FIG. 1 illustrates an example of a service environment using a voice-based interface according to an example embodiment. The example embodiment of FIG. 1 represents an example in which an electronic device 100 including a voice-based interface (e.g., a microphone and a speaker) recognizes and analyzes a voice request received in response to "Turn off light" 121 that is an utterance of a user 110 through a microphone and outputs response information "Shall I turn off light in living room?" 122 through a speaker in technology for connecting and controlling in-house devices, such as a smart home or a home network service. Also, the example embodiment of FIG. 1 illustrates an example in which the electronic device 100 recognizes and analyzes a voice request received in response to "Yes" 123 that is an utterance of the user 110 corresponding to the response information and controls a light power of an in-house lighting device 130 interacting with the electronic device 100 over an internal network.

Here, in-house devices may include various devices connectable and controllable online, for example, home appliances such as an Internet protocol television (IPTV), a personal computer (PC), a peripheral device, an air conditioner, a refrigerator, and a robot vacuum cleaner, energy consumption devices such as an air-conditioning and heating device, and a security device such as a door lock and a surveillance camera, in addition to the aforementioned in-house lighting device 130. Also, the internal network may employ wired network technology, for example, Ethernet, HomePNA, and Institute of Electrical and Electronics Engineers (IEEE) 1394, and wireless network technology such as Bluetooth, ultra wideband (UWB), ZigBee, wireless 1394, and a home radio frequency (RF).

The electronic device 100 may be one of in-house devices. For example, the electronic device 100 may be one of devices such as an AI speaker or a robot vacuum cleaner provided in a house. Also, the electronic device 100 may be a mobile device of the user 110, for example, a smartphone, a mobile phone, a laptop computer, a digital broadcasting terminal, a personal digital assistant (PDA), a portable multimedia player (PMP), and a tablet PC. As described above, any type of devices including a function connectable to in-house devices to receive a voice request of the user 110 and to control the in-house devices may be used for the electronic device 100 without being particularly limited. Also, depending on example embodiments, the aforementioned mobile devices of the user 110 may be included as the in-house devices.

Although response information may be basically output through a main medium (e.g., a speaker) corresponding to a voice-based interface as shown in the example embodiment of FIG. 1, the response information may be output through further a variety of media depending on example embodiments, which is described above. The electronic device 100 may determine media through which at least one of an answering voice and another output associated with the answering voice is output based on at least one of a voice request and response information corresponding to the voice request. For example, FIG. 1 further illustrates an IPTV 140 and a mobile device 150 of the user 110. In this case, the other output associated with the answering voice may be output for the user 110 in a visual manner (e.g., light emitting diode (LED) lighting or flickering, etc.) or in a tactile manner (e.g., a vibration, etc.) through the display of the IPTV 140 or the mobile device 150. Here, the electronic device 100 may determine media for providing another output based on a type of information or efficiency of information output instead of simply determining the media for providing the other output. For example, outputting information through media in the living room when the user is in the living room may be more efficient than outputting information through media in the kitchen.

Figure 2:
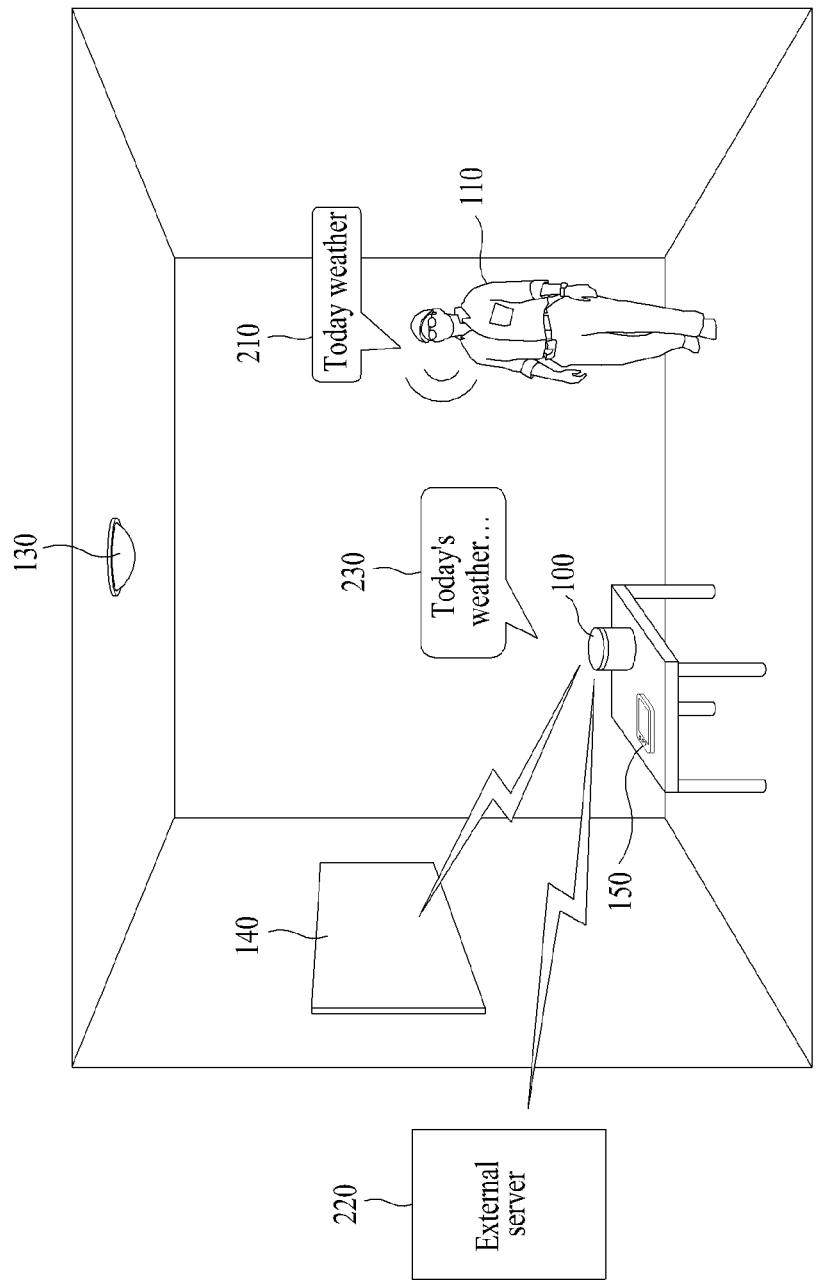
FIG. 2 illustrates another example of a service environment using a voice-based interface according to an example embodiment.

FIG. 2 illustrates another example of a service environment using a voice-based interface according to an example embodiment. The example embodiment of FIG. 2 represents an example in which the electronic device 100 including a voice-based interface recognizes and analyzes an utterance "Today weather" 210 of the user 110, acquires information about today's weather from an external server 220 over an external network, and synchronizes and outputs the acquired information as a voice "Todays' weather . . . ". For example, the external network may include at least one of network topologies that include a personal area network (PAN), a local area network (LAN), a campus area network (CAN), a metropolitan area network (MAN), a wide area network (WAN), a broadband network (BBN), and the Internet.

In the example embodiment of FIG. 2, the electronic device 100 may be one of in-house devices or one of mobile devices of the user 110. Any type of devices including a function for receiving and processing a voice request of the user 110 and a function for connecting to the external server 220 and providing content or a service provided from the external server 220 to the user 110 may be used for the electronic device 100 without being particularly limited. For example, the electronic device 100 may process a voice request of the user 110 by recognizing and analyzing the voice request, and depending on example embodiments, may also process the voice request through an external platform, for example, the aforementioned cloud AI platform, linked to the electronic device 100.

Here, the electronic device 100 may automatically determine media for outputting response information corresponding to the voice request of the user 110 based on the response information. FIG. 2 illustrates an example in which the electronic device 100 outputs the response information auditorily such as "Today's weather . . . " 230, and at the same time, provides another output associated with the response information visually through a display of the IPTV 140. To this end, the electronic device 100 may manage information about a plurality of pieces of media capable of outputting response information, may select at least one piece of media for providing another output from among the plurality of pieces of media based on the response information corresponding to the voice request, and may deliver the other output associated with the response information to the selected media.

Figure 3:
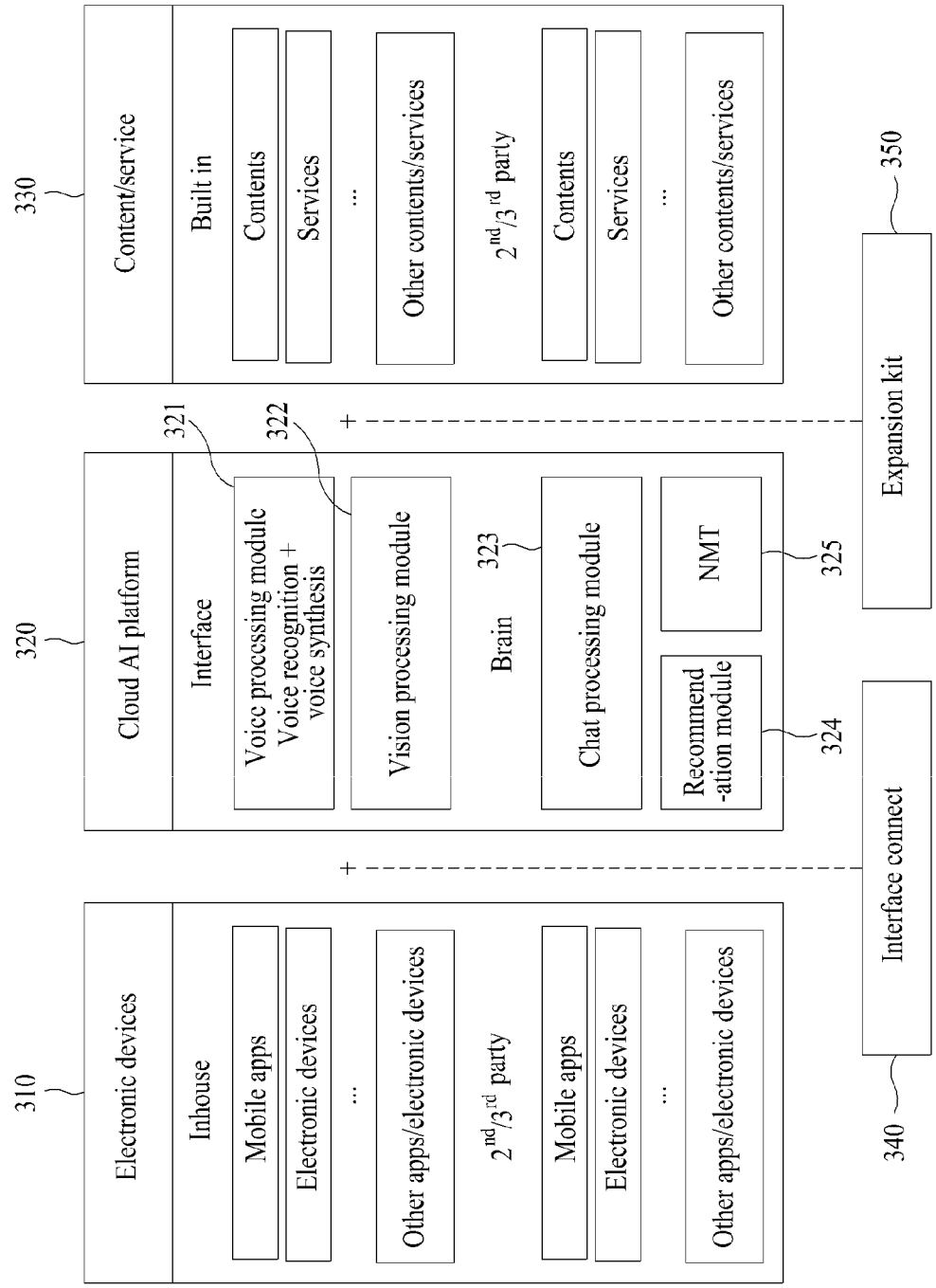
FIG. 3 illustrates an example of a cloud artificial intelligence (AI) platform according to an example embodiment.

FIG. 3 illustrates an example of a cloud AI platform according to an example embodiment. FIG. 3 illustrates electronic devices 310, a cloud AI platform 320, and a content/service 330.

For example, the electronic devices 310 may indicate devices provided in a house, and may at least include the aforementioned electronic device 100. The electronic devices 310 or applications (hereinafter, apps) installed and executed on the electronic devices 310 may be linked to the cloud AI platform 320 through an interface connection 340. Here, the interface connection 340 may provide developers with a software development kit (SDK) and/or development documents for developing the electronic devices 310 or apps installed and executed on the electronic devices 310. Also, the interface connection 340 may provide an application program interface (API) such that the electronic devices 310 or the apps installed and executed on the electronic devices 310 may use functions provided from the cloud AI platform 320. In detail, devices or apps developed by the developers using the SDK and/or development documents provided from the interface connection 340 may use functions provided from the cloud AI platform 320 using the API provided from the interface connection 340.

Here, the cloud AI platform 320 may provide a function for providing a voice-based service. For example, the cloud AI platform 320 may include various modules for providing a voice-based service, such as a voice processing module 321 configured to recognize a received voice and synthesize a voice to be output, a vision processing module 322 configured to analyze and process a received image or video, a chat processing module 323 configured to determine an appropriate chat to output a voice suitable for the received voice, a recommendation module 324 configured to recommend a function suitable for the received voice, and a neural machine translation (NMT) 325 configured to support AI to translate a language based on a sentence unit through data learning.

For example, in the example embodiments of FIGS. 1 and 2, the electronic device 100 may transmit a voice request of the user 110 to the cloud AI platform 320 using the API provided from the interface connection 340. In this case, the cloud AI platform 320 may recognize and analyze the received voice request through the aforementioned modules 321 through 325, and may synthesize and provide an appropriate answering voice or may recommend an appropriate operation in response to the received voice request.

Also, an expansion kit 350 may provide a development kit such that third party content developers or companies may configure a new voice-based function based on the cloud AI platform 320. For example, in the example embodiment of FIG. 2, the electronic device 100 may transmit the received voice request of the user 110 to the external server 220, and the external server 220 may transmit the voice request to the cloud AI platform 320 through the API provided through the expansion kit 350. In this case, similar to the aforementioned manner, the cloud AI platform 320 may recognize and analyze the received voice request and may synthesize and provide an appropriate answering voice or may provide the external server 220 with recommendation information about a function to be processed through the voice request. For example, referring to FIG. 2, the external server 220 may transmit the voice request "Today weather" to the cloud AI platform 320 and may receive, from the cloud AI platform 320, keywords "today" and "weather" that are extracted by recognizing the voice request "Today weather". In this case, the external server 220 may generate text information, such as "Today's weather . . . " using the keywords "today" and "weather" and may transmit again the generated text information to the cloud AI platform 320. Here, the cloud AI platform 320 may synthesize the text information with a voice and may provide the synthesized voice to the external server 220. The external server 220 may transmit the synthesized voice to the electronic device 100 and the electronic device 100 may output the synthesized sound "Today's weather . . . " through a speaker. In this manner, the voice request "today weather" received from the user 110 may be processed. The content/service 330 includes contents and services that can be provided to the electronic devices 310 in the cloud AI platform 320 through an API provided through the expansion kit 350.

Figure 4:
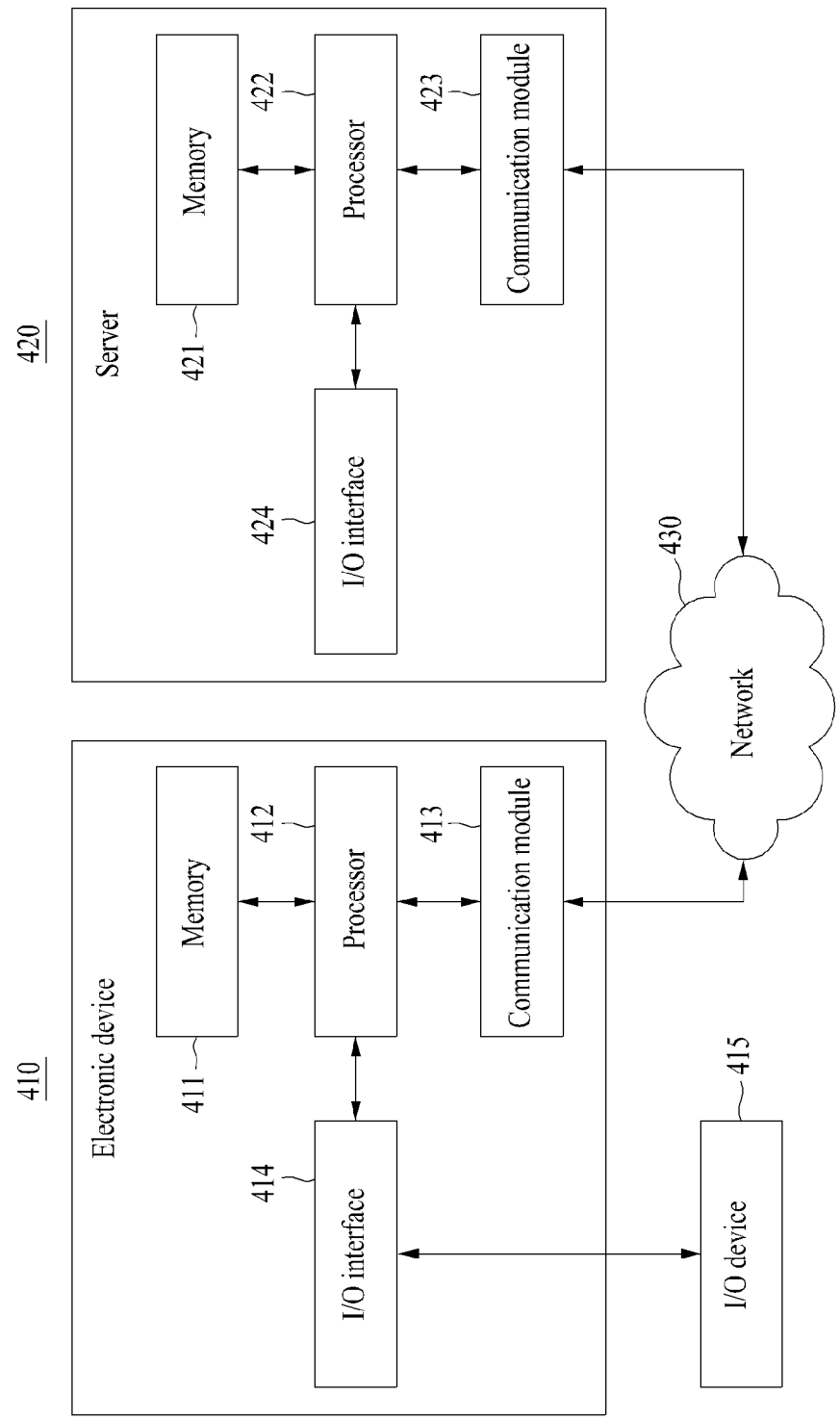
FIG. 4 is a block diagram illustrating an example of a configuration of an electronic device and a server according to an example embodiment.

FIG. 4 is a block diagram illustrating an example of an electronic device and a server according to an example embodiment. An electronic device 410 of FIG. 4 may correspond to the aforementioned electronic device 100, and a server 420 may correspond to the aforementioned external server 220 or a single computer apparatus that constitutes the cloud AI platform 320.

Referring to FIG. 4, the electronic device 410 may include a memory 411, a processor 412, a communication module 413, and an input/output (I/O) interface 414, and the server 420 may include a memory 421, a processor 422, a communication module 423, and an I/O interface 424. The memory 411, 421 may include a permanent mass storage device, such as a random access memory (RAM), a read only memory (ROM), and a disk drive, as a non-transitory computer-readable storage medium. The permanent mass storage device, such as ROM and disk drive, may be included in the electronic device 410 or the server 420 as a permanent storage device separate from the memory 411, 421. Also, an OS or at least one program code, for example, a code for an application installed and executed on the electronic device 410 to provide a specific service, may be stored in the memory 411, 421. Such software components may be loaded from another non-transitory computer-readable storage medium separate from the memory 411, 421. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 411, 421 through the communication module 413, 423, instead of the non-transitory computer-readable storage medium. For example, at least one program may be loaded to the memory 411 of the electronic device 410 based on a computer program, for example, the application, installed by files provided over a network 430 from developers or a file distribution system providing an installation file of the application.

The processor 412, 422 may be configured to process instructions of a computer program by performing basic arithmetic operations, logic operations, and I/O operations. The computer-readable instructions may be provided from the memory 411, 421 or the communication module 413, 423 to the processor 412, 422. For example, the processor 412, 422 may be configured to execute received instructions in response to the program code stored in the storage device, such as the memory 411, 421.

The communication module 413, 423 may provide a function for communication between the electronic device 410 and the server 420 over the network 430 and may provide a function for communication between the electronic device 410 and/or the server 420 and another electronic device or another server. For example, the processor 412 of the electronic device 410 may forward a request created based on a program code stored in the storage device such as the memory 411, to the server 420 over the network 430 under control of the communication module 413. Inversely, a control signal, an instruction, content, a file, etc., provided under control of the processor 422 of the server 420 may be received at the electronic device 410 through the communication module 413 of the electronic device 410 by going through the communication module 423 and the network 430. For example, a control signal, an instruction, content, a file, etc., of the server 420 received through the communication module 413 may be forwarded to the processor 412 or the memory 411, and content, a file, etc., may be stored in a storage medium, for example, the permanent storage device, further includable in the electronic device 410.

The I/O interface 414 may be a device used for interface with an I/O apparatus device 415. For example, an input device of the I/O device 415 may include a device, such as a microphone, a keyboard, and a mouse, and an output device of the I/O device 415 may include a device, such as a display and a speaker. As another example, the I/O interface 414 may be a device for interface with an apparatus in which an input function and an output function are integrated into a single function, such as a touchscreen. The I/O apparatus 415 may be configured as a single device with the electronic device 410. Also, the I/O interface 424 of the server 420 may be a device for interface with an apparatus (not shown) for input or output that may be connected to the server 420 or included in the server 420.

According to other example embodiments, the electronic device 410 and the server 420 may include a smaller or greater number of components than a number of components shown in FIG. 4. However, there is no need to clearly illustrate many components according to the related art. For example, the electronic device 410 may include at least a portion of the I/O apparatus 415, or may further include other components, for example, a transceiver, a global positioning system (GPS) module, a camera, a variety of sensors, a database (DB), and the like. In detail, if the electronic device 410 is a smartphone, the electronic device 410 may be configured to further include a variety of components, for example, an accelerometer sensor, a gyro sensor, a camera module, various physical buttons, a button using a touch panel, an I/O port, a vibrator for vibration, etc., which are generally included in the smartphone.

In the example embodiments, the electronic device 410 may basically include a microphone for receiving a voice request of a user and/or a speaker for auditorily outputting response information as the I/O apparatus 415.

Figure 5:
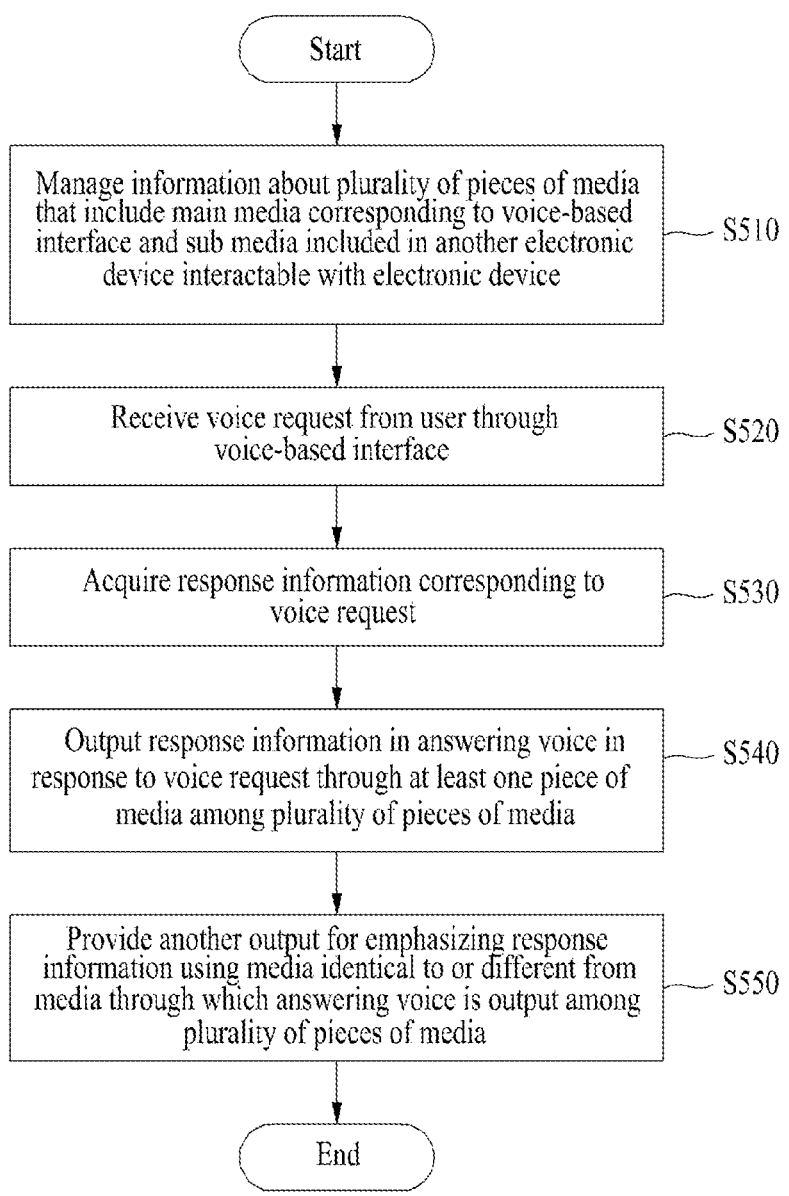
FIG. 5 is a flowchart illustrating an example of an information providing method according to an example embodiment.

FIG. 5 is a flowchart illustrating an example of an information providing method according to an example embodiment. The information providing method according to the example embodiment may be performed by a computer apparatus, such as the electronic device 410. Here, the processor 412 of the electronic device 410 may be configured to execute a control instruction according to a code of at least one program or a code of an OS included in the memory 411. Here, the processor 412 may control the electronic device 410 to perform operations S510 to S550 included in the information providing method of FIG. 5 in response to a control instruction provided from the code stored in the electronic device 410.

In operation S510, the processor 412 may manage information about a plurality of pieces of media that include a main medium corresponding to a voice-based interface and a sub medium included in another electronic device interactable with the electronic device 410. For example, the identification information and the location information of the electronic device 410 or the application corresponding to the sub media, such as the identification information and the location information of the electronic device corresponding to the main media, may be stored in a table. Here, the processor 412 may manage information about a plurality of pieces of different media included in a plurality of different electronic devices capable of performing visual, auditory, tactile output, etc., through interaction with another electronic device. The sub medium may correspond to, for example, a display or a speaker of the other electronic device, an application installed on the other electronic device, and the like. For example, the processor 412 may manage information about electronic devices capable of outputting information among in-house electronic devices, such as, a display or an LED of an electronic device A, a speaker, a vibrator, an audio application installed in the electronic device A, a virtual reality (VR) related application, a map application, a search application, a translation application, a game application, a messenger application, a store application, and the like, and information about corresponding sub medium by setting applications included in the corresponding electronic devices as the respective sub medium. Also, the processor 412 may manage information about the main medium corresponding to the voice-based interface included in the electronic device 410.

In operation S520, the processor 412 may receive a voice request from the user through the voice-based interface. For example, the processor 412 may receive a voice request according to an utterance of the user through a voice input device, such as, a microphone included in the electronic device 410 or a microphone interacting with the electronic device 410.

In operation S530, the processor 412 may acquire response information corresponding to the voice request. Here, the processor 412 may generate the response information corresponding to the voice request by directly recognizing and analyzing the voice request. Depending on example embodiments, the processor 412 may acquire the response information using an external platform, such as the aforementioned cloud AI platform 320. For example, the processor 412 may transmit the received voice request to an external platform. Here, the external platform may generate suitable response information by recognizing and analyzing the received voice request and may transmit the generated response information to the electronic device 410.

The response information refers to a reply to the voice request and may include a variety of information, for example, information for confirming the intent of the user, information for notifying processing of an operation suitable for the intent of the user, and/or a retrieved search result for the intent of the user. For example, response information corresponding to a voice request of the user "Today weather" may include information based on a search result "It will be generally sunny today, but a level of fine dust is bad".

In operation S540, the processor 412 may output the response information in an answering voice in response to the voice request of the user through at least one piece of media among the plurality of pieces of media. The processor 412 may deliver the response information to the corresponding media such that the response information may be auditorily output through the at least one media. Here, the processor 412 may provide the response information corresponding to the voice request of the user in a voice that is an auditory output form using at least one media among the plurality of pieces of media. For example, the electronic device 410 may output the answering voice in response to the voice request of the user through the main medium.

In operation S550, the processor 412 may provide another output for emphasizing the answering voice using at least one piece of media identical to or different from the media through which the answering voice is output among the plurality of pieces of media. That is, as the response information corresponding to the voice request of the user, the electronic device 410 may output the answering voice that is an auditory output and may also provide the other output for improving the information delivery capability of the response information. Here, the electronic device 410 may further maximize the information delivery capability of the response information by providing the other output through synchronization with the output of the answering voice.

The other output for emphasizing the answering voice relates to at least a portion of the response information. The at least a portion of the response information that is provided as the other output may include primary or key information corresponding to the key points related to the voice request. The primary information may include information about a variable of an answer template for the answering voice or information to which a semantic tag is assigned in the response information. The primary information included in the response information may include grade information, numerical value information, and orientation information based on a type of information. For example, weather information may include state information classified into sunny, slightly cloudy, cloudy, rain or snow, etc., fine dust information may include concentration level information and stage information classified into good, normal, bad, very bad, etc., and road guidance information may include orientation information, such as go straight, make a left, make a right, U-turn, etc., and traffic speed information, such as congestion, delay, go slow, and smooth traffic, etc. In the case of providing response information corresponding to the voice request, the electronic device 410 may output an answering voice and may also provide another output with respect to primary information included in the response information. Here, to provide the other output for emphasizing the answering voice, the electronic device 410 may provide the primary information included in the response information and, in this instance, may output the primary information using a size or a type corresponding to grade information, numerical value information, and orientation information included in the primary information. For example, in the case of outputting the other output through an LED, strength or type of light, a flickering pattern, and the like may vary based on the grade information, the numerical value information, and the orientation information.

The processor 412 may synthesize and thereby output the response information corresponding to the voice request with a voice. Here, an answer template for the voice request may be defined in advance. The processor 412 may synthesize and thereby output primary information, which is variable based on the response information, with the answer template. For example, in response to receiving a voice request "Today weather", primary information, such as "Today's weather is 'sunny'. Also, a level of fine dust is '112', which is a level of 'bad'" may be synthesized and output in a voice based on response information corresponding to the voice request with respect to a predefined answer template "Today's weather is _____. Also, a level of fine dust is _____, which is _____." Here, the electronic device 410 may additionally provide at least a portion of the response information, for example, the primary information as the other output to emphasize the response information corresponding to the voice request. The electronic device 410 may also provide the other output with respect to at least one of 'sunny', '112', and 'bad' corresponding to the primary information in the above answering voice.

Figure 6:
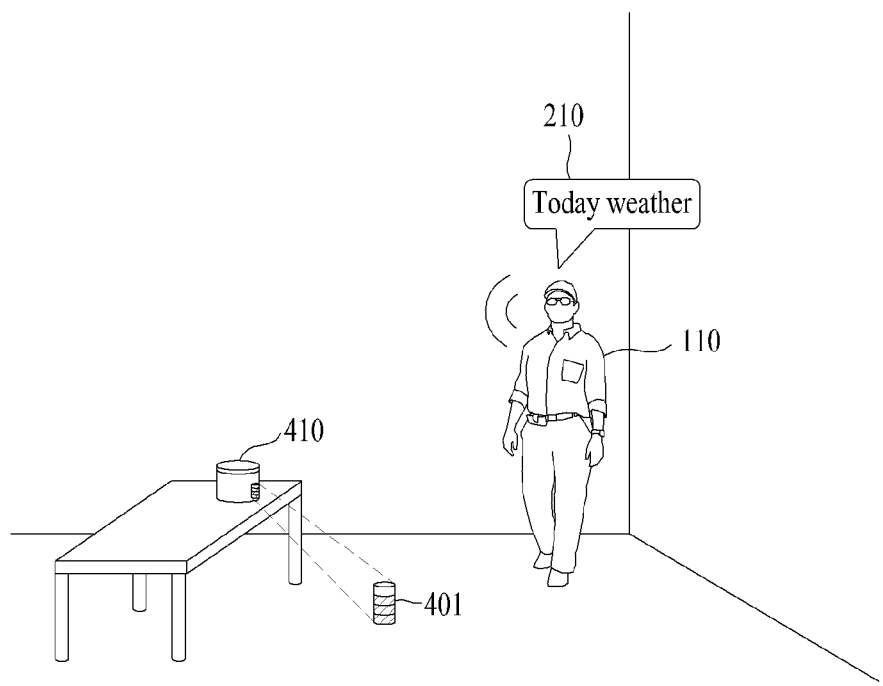
FIG. 6 illustrates an example of providing another output for improving an information delivery capability in addition to an answering voice as response information corresponding to a voice request according to an example embodiment.

FIG. 6 illustrates an example in which the electronic device 410 including a voice-based interface acquires information about today's weather from an external server over an external network by recognizing and analyzing the utterance "Today weather" 210 of the user 110 and synthesizes and outputs the acquired information with a voice. As response information corresponding to the voice request "Today weather" 210, the electronic device 410 may output an answering voice "Today's weather is sunny. Also, the level of fine dust is 112, which is a bad level." through a speaker of the electronic device 410. Also, the electronic device 410 may output light in scarlet through an LED 401 included in the electronic device 410 through synchronization with a point in time at which 'bad' included in the response information is output in a voice. For example, in the case of using the LED 401 to emphasize the response information corresponding to the voice request "Today weather" 210, the electronic device 410 may turn ON blue light if a level of fine dust is good, green light if a level of fine dust is normal, scarlet light if a level of fine dust is bad, and red light if a level of fine dust is very bad, based on a level of fine dust included in the response information. As another example, when the LED 401 is divided into four regions, the electronic device 410 may provide another output in a form of turning ON a single column among the four regions if a level of fine dust is good, two columns if a level of fine dust is normal, three columns if a level of fine dust is bad, and four columns if a level of fine dust is very bad.

As another example, in the case of providing another output for emphasizing the answering voice, the electronic device 410 may additionally synthesize a tone of voice when a voice corresponding to primary information included in response information is output. The electronic device 410 may synthesize an additional tone as another output with respect to a voice of a part to which a semantic tag is assigned when an answering voice according to the response information is output. Here, a magnitude or a type of the tone for providing the other output may vary based on grade information, numerical value information, and orientation information corresponding to the primary information. For example, in the case of outputting a level of fine dust included in the response information using a voice to emphasize the response information corresponding to the voice request "Today weather" 210, the electronic device 410 may apply, to the answering voice, a voice of a high tone by a desired level compared to a predetermined voice output level if a level of fine dust is bad or very bad.

As another example, as another output for emphasizing the answering voice, the electronic device 410 may provide the primary information included in the response information in a visual output form. That is, the electronic device 410 may synthesize and thereby output the response information corresponding to the voice request with a voice. During this process, the electronic device 410 may additionally output only primary information in the response information in a visual form.

As another example, as another output for emphasizing the answering voice, the electronic device 410 may provide primary information in the response information in a tactile output form. For example, during a process of outputting the answering voice, the electronic device 410 may output a vibration based on primary information included in the response information. A magnitude or a pattern of vibration that is a single tactile output form may vary based on grade information, numerical value information, and orientation information corresponding to the primary information.

As another example, as another output for emphasizing the answering voice during a process of outputting the answering voice, the electronic device 410 may output at least one multimedia content among background music (BGM), image, and video based on primary information included in response information. Here, multimedia content provided as the other output may be determined based on grade information, numerical value information, and orientation information corresponding to the primary information. The grade information, the numerical value information, and the orientation information may be included in advance in the multimedia content. Accordingly, the multimedia content that matches the primary information included in the response information may be output as another output. If an image or a video is provided as the other output, the image or the video may be provided as VR content using a head mounted display (HDM).

Accordingly, the electronic device 410 may output the answering voice as response information that is acquired in response to the voice request associated with 'weather' and may also provide another additional output with respect to information about, for example, a fine dust concentration. Here, as the other output aside from the answering voice, the electronic device 410 may additionally provide a visual output (LED, display, etc.) auditory output (tone, etc.), and tactile output (vibration) with respect to the fine dust concentration. Further, by changing a size or a type of the other output for emphasizing response information based on a grade of the fine dust concentration that is primary information in the response information corresponding to the voice request 'weather', the information delivery capability of the response information corresponding to the voice request may be further improved.

Also, when information associated with road guidance is included in the response information corresponding to the voice request, the electronic device 410 may output the response information through interaction with a map application of the electronic device 410 or another electronic device. Here, the electronic device 410 may output the answering voice corresponding to the response information and may additionally provide primary information included in the response information in a form of visual output, auditory output, tactile output, etc., as the other output for emphasizing the response information. For example, when orientation information, such as go straight, make a left, make a right, U-turn, etc., is included in the response information, the electronic device 410 may output a vibration as the tactile output at a time of outputting the orientation information in a voice. As another example, when traffic speed information, for example, congestion, delay, go slow, smooth traffic, etc., is included in the response information, LED output according to a corresponding traffic speed may be provided at a time of outputting the traffic speed information in a voice. For example, in the case of using the LED, the electronic device 410 may turn ON blue light if the traffic speed information indicates smooth traffic, green light if the traffic speed information indicates go slow, scarlet light if the traffic speed information indicates delay, and red light if the traffic speed information indicates congestion.

The other output for emphasizing the answering voice provided as the response information corresponding to the voice request of the user may be provided in a form of at least one of the visual output, the auditory output, and the tactile output through media identical to media through which the answering voice is output and media different from the media through which the answering voice is output. Here, the other output may be provided with respect to primary information included in the response information and may be provided at a point in time at which the primary information is synchronized with the answering voice and thereby output in the voice. If the primary information is classified into grade information, numerical value information, and orientation information, the other output may be provided based on a size or a type into which corresponding information is classified.

Further, the electronic device 410 may determine at least one piece of medium for providing another output with respect to the response information among a plurality of pieces of media based on at least one of the voice request and the response information. In the example embodiments, media for providing the other output with respect to the response information may be selected from various media based on the voice request and/or the response information instead of simply being preset. For example, in response to a voice request recognized according to an utterance of the user, the electronic device 410 may synthesize response information with a voice and may output the response information in an auditory form and may also select media for auditory output, media for visual output, media for audiovisual output, or media for tactile output based on a type of the voice request. Such a selection of media may be performed based on information delivery efficiency that is verified based on the voice request and/or the response information. For example, outputting information through the media in the living room when the user is in the living room may be more efficient than outputting the information through the media in the kitchen.

According to example embodiments, it is possible to provide an aggressive and intuitive answer in response to a voice request of a user and to improve information delivery capability for response information by outputting an answering voice as the response information corresponding to the voice request of the user and by also providing another output for emphasizing the response information. Also, according to example embodiments, in the case of additionally providing another output different from an answering voice as response information corresponding to a voice request of a user, it is possible to effectively provide the response information to the user by selecting appropriate media, such as, selecting visually outputtable media with respect to information of which visual delivery is efficient and selecting auditorily outputtable media with respect to information of which auditory delivery is efficient.

FIG. 7 illustrates an example of media information according to an example embodiment. A table 700 of FIG. 7 includes a device field 710 for identifying electronic devices interacting with the electronic device 410, a position field 710 for identifying in-house positions of other electronic devices, an output media field 730 for identifying a sub medium included in the other electronic devices, a details field 740 including information about the sub medium, and an information type item 750 for identifying information types associable with the sub medium. Referring to the table 700, the electronic device 410 may manage information about the other electronic devices interacting in a house and information about output media of the corresponding other electronic devices. Also, the information may be connected in advance to an information type of the voice request and/or response information. For example, if the voice request of the user or the corresponding response information is analyzed as an information type associated with "visual output", the electronic device 410 may determine a display 1 of an electronic device A as media for providing another output associated with the response information by referring to the table 700. In this case, the electronic device 410 may output an answering voice corresponding to the response information through a speaker of a main medium and may also provide another output for emphasizing the response information through the display 1 of the electronic device A through synchronization with the answering voice. As another example, if the voice request of the user or the corresponding response information is analyzed as an information type associated with "place", the electronic device 410 may determine a map application of the electronic device A as media for outputting the response information by referring to the table 700. In this case, the electronic device 410 may output the answering voice corresponding to the response information through a speaker of the main medium. Also, the response information may be forwarded to the electronic device A and the electronic device A may provide the user with another output for emphasizing the response information with a map service corresponding to the response information through the map application of the electronic device A.

Figure 8:
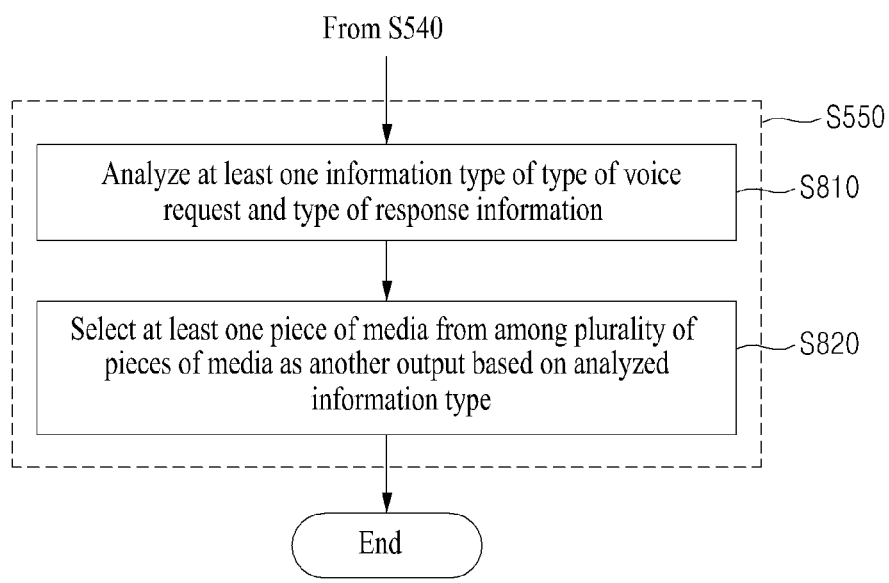
FIG. 8 is a flowchart illustrating an example of a method of determining media according to an example embodiment.

FIG. 8 is a flowchart illustrating an example of a method of determining media according to an example embodiment. Operations S810 and S820 of FIG. 8 may be included in operation S550 of FIG. 5 and thereby performed.

In operation S810, the electronic device 410 may analyze at least one information type of a type of the voice request and a type of response information. For example, the type of the voice request may be classified based on a subject (e.g., weather, position, place, traffic, search, singer, movie, etc.) of the voice request and the type of the response information may be classified based on a representation format (e.g., text, image, video, flash, etc.) of content included in the response information.

In operation S820, the electronic device 410 may select at least one piece of media from among a plurality of pieces of media as media for another output based on the analyzed information type. For example, if a webpage including a text, an image, and coordinates (or an address) corresponding to a voice request 'weather' is acquired, the electronic device 410 may select three pieces of media that include a main medium for synthesizing and thereby outputting the text in a voice, first sub medium corresponding to a display for visually outputting the image, and second sub medium corresponding to a map application for providing a map service using the coordinates (or the address) and may forward the acquired response information to each of the three pieces of media. Depending on example embodiments, the electronic device 410 may process the response information to information available in each piece of media and may forward the processed response information. For example, the electronic device 410 may extract coordinates (or address) from a webpage that is acquired as response information and may transmit a map service request including the extracted coordinates (or address) to the second sub medium corresponding to the map application as the response information.

Also, as described above, the determined at least one piece of media may include a sub medium corresponding to a display of another electronic device. In this case, in operation S550, the electronic device 410 may transmit visual information included in the response information to the other electronic device such that the response information may be output through the display of the other electronic device. For example, the electronic device 410 may transmit the image or the video included in the webpage to the other electronic device. Alternatively, the electronic device 410 may also transmit the webpage itself to the other electronic device.

Also, the determined at least one media may include a sub medium corresponding to an application installed on the other electronic device. In this case, in operation S550, the electronic device 410 may transmit the response information to a service server providing a service through the other electronic device or the application such that the response information may be provided through the other electronic device in conjunction with a service provided from the application.

Also, as described above, a plurality of pieces of media may be selected to output the response information in a duplicated or distributed manner. For example, in operation S550, the electronic device 410 may transmit the response information to the main medium corresponding to the voice-based interface to output the response information in an auditory manner, and may further transmit the response information to at least one sub medium of first sub medium corresponding to the other electronic device or second sub medium corresponding to the application installed on the other electronic device for the other output for emphasizing the response information. As described above, the response information may be processed to be suitable for each piece of media and thereby distributed and provided. The example in which the answering voice corresponding to the voice request "Today weather" 210 of the user 110 is output as auditory information through the speaker of the electronic device 410 is output and visual information is additionally output through the LED 401 of the electronic device 410 is described above with reference to FIG. 6.

Meanwhile, media capable of providing another output for emphasizing response information based on a position of a user and a position between other electronic devices may be determined.

Figure 9:
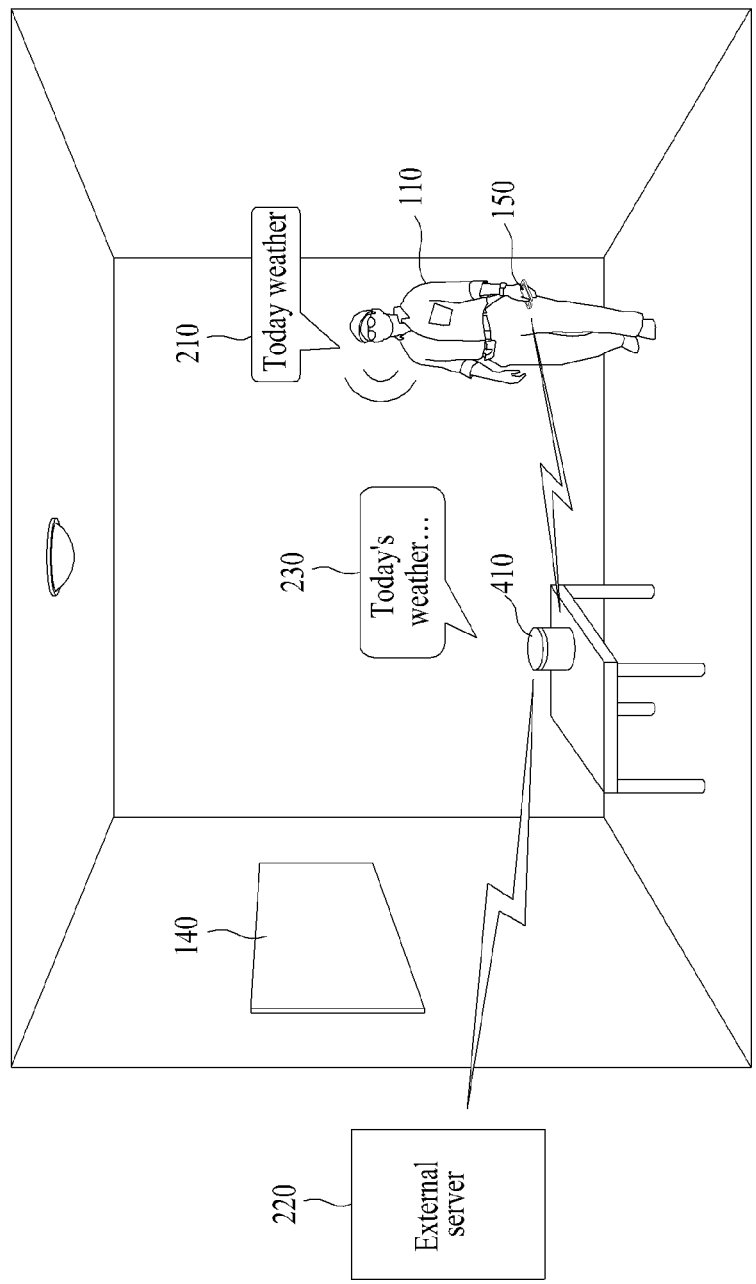
FIG. 9 illustrates an example of determining media based on a position of a user according to an example embodiment.

FIG. 9 illustrates an example of determining media based on a position of a user according to an example embodiment. An example of outputting visual information of an answering voice through the electronic device 410 and, at the same time, outputting visual information as another output through the IPTV 140 is described above. Also, as described above with reference to FIG. 7, various types of electronic devices capable of outputting visual information may be present. FIG. 9 illustrates an example of selecting media of the mobile device 150 relatively close to the user 110 from between the IPTV 140 and the mobile device 150 capable of outputting visual information.

For example, the electronic device 410 may manage positions of different electronic devices that correspond to a plurality of pieces of media and interact with the electronic device 410. The table 700 of FIG. 7 shows an example of managing a position of each of the electronic devices. Here, positions of electronic devices present in a house may be set using various methods. For example, such a position may be input and set to the electronic device 410 by the user 110 or an administrator, or may be measured based on known positioning technology, using such as strength of a signal transmitted and received for communication between the electronic device 410 and the other electronic devices. In particular, a position of the mobile device 150 may be dynamically measured using the positioning technology. Here, the electronic device 410 may determine at least one piece of media by further using a distance between the user 110 and the plurality of other electronic devices that is measured based on the position of the user 110 and the positions of the plurality of other electronic devices. Here, the position of the user 110 may be measured based on an utterance of the user 110. For example, the electronic device 410 may generate position information associated with a voice input based on a phase shift of the voice input that is input through a plurality of microphones included in the voice-input interface and may determine the generated position information as the position of the user 110. Technology for measuring an originating position of a sound signal based on a phase shift of the same sound signal input through the plurality of microphones may be easily understood by those skilled in the art through the known art, such as, for example, beamforming technology. In this case, the electronic device 410 may forward the response information to another electronic device closest to the user 110 based on the position of the user 110 and the positions of the other electronic devices. For example, referring to FIG. 9, the response information is forwarded to the mobile device 150 closest to the user 110 between the IPTV 140 and the mobile device 150 capable of performing another output for emphasizing the response information.

As described above, according to example embodiments, by managing information about a plurality of pieces of media, such as a main medium corresponding to a voice-based interface included in an electronic device, such as an AI speaker, and a sub medium (e.g., an output device included in a smartphone, an IPTV, a lighting, a smart refrigerator, etc.) included in another electronic device interacting with the electronic device and by providing an answering voice according to response information and another output capable of emphasizing the answering voice through at least one piece of media among a plurality of pieces of media based on response information corresponding to a voice request received through the voice-based interface, it is possible to improve the information delivery capability of the response information corresponding to the voice request through an adaptive and expanded information output method.

The systems or apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be recorded in non-transitory computer-readable media including program instructions to implement various operations of the above-described example embodiments. The media may also include, alone or in combination with the program instructions, data files, data structures, and the like. The media may continuously store a program executable by a computer or may temporarily store the program for execution or download. Also, the media may be various types of recording devices or storage devices in which a single piece or a plurality of pieces of hardware may be distributed over a network without being limited to a medium directly connected to a computer system. Examples of the media include magnetic media such as hard disks, floppy disks, and magnetic tapes; optical media such as CD-ROM discs and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed at Appstore that distributes applications or sites and servers that supply and distribute various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An information providing method performed by an electronic device having a voice-based interface, the method comprising:
   receiving a voice request from a user through the voice-based interface;
   acquiring response information corresponding to the voice request;
   outputting the response information in an answering voice that is an auditory output form through at least one of a plurality of pieces of media including a main medium corresponding to the voice-based interface and at least one sub medium included in at least one in-house device designed and constructed for use in, and in functioning of, a home or a building, the at least one in-house device being interactable with the electronic device through an internal network communicatively connecting the electronic device with the at least one in-house device;
   analyzing the voice request or the response information for at least one information type desired by the user;
   selecting at least one sub medium based on the analyzed at least one information type; and
   providing another output with respect to at least a portion of the response information through the selected at least one sub medium among the plurality of pieces of media for instructing the at least one in-house device to operate as designed and constructed.

2. The method of claim 1, wherein the other output is provided in at least one of a visual output form, a tactile output form, and an auditory output form.

3. The method of claim 1, wherein the other output is provided with respect to information about a variable of an answer template for the answering voice or information to which a semantic tag is assigned in the response information.

4. The method of claim 1, wherein the other output comprises at least one of grade information, numerical value information, and orientation information as primary information included in the response information.

5. The method of claim 1, wherein the providing of the other output comprises differently providing at least one of a size, a type, and a pattern of the other output based on at least one of grade information, numerical value information, and orientation information included in the response information.

6. The method of claim 1, wherein the providing of the other output comprises turning ON a light emitting diode (LED) based on at least one of grade information, numerical value information, and orientation information included in the response information, in response to outputting the answering voice.

7. The method of claim 1, wherein the providing of the other output comprises synthesizing an additional tone based on at least one of grade information, numerical value information, and orientation information included in the response information, in response to outputting the answering voice.

8. The method of claim 1, wherein the providing of the other output comprises providing multimedia content associated with the response information in response to outputting the answering voice.

9. The method of claim 1, wherein the other output is provided through synchronization with an output of the answering voice.

10. A non-transitory computer-readable recording medium storing a program configured to be executed by a computer to implement the method according to claim 1.

11. The method of claim 1, wherein the in-house device includes a heater, an air conditioner, a refrigerator, a robot vacuum cleaner, an HVAC system, a door lock, a surveillance camera, or a lighting device.

12. An electronic device comprising:
    a voice-based interface; and at least one processor configured to execute a computer-readable instruction, wherein the at least one processor is configured to receive a voice request from a user through the voice-based interface, acquire response information corresponding to the voice request, output the response information in an answering voice that is an auditory output form through at least one of a plurality of pieces of media including a main medium corresponding to the voice-based interface and at least one sub medium included in at least one in-house device designed and constructed for use in, and in functioning of, a home or a building, the at least one in-house device being interactable with the electronic device through an internal network communicatively connecting the electronic device with the at least one in-house device, analyze the voice request or the response information for at least one information type desired by the user, select at least one sub medium based on the analyzed at least one information type, and provide another output with respect to at least a portion of the response information through the selected at least one sub medium among the plurality of pieces of media for instructing the at least one in-house device to operate as designed and constructed.

13. The electronic device of claim 12, wherein the other output is provided in at least one of a visual output form, a tactile output form, and an auditory output form.

14. The electronic device of claim 12, wherein the other output is provided with respect to information about a variable of an answer template for the answering voice or information to which a semantic tag is assigned in the response information.

15. The electronic device of claim 12, wherein the other output comprises at least one of grade information, numerical value information, and orientation information as primary information included in the response information.

16. The electronic device of claim 12, wherein the at least one processor, to provide the other output, is configured to differently provide at least one of a size, a type, and a pattern of the other output based on at least one of grade information, numerical value information, and orientation information included in the response information.

17. The electronic device of claim 12, wherein the at least one processor is configured to turn ON a light emitting diode (LED) as the other output based on at least one of grade information, numerical value information, and orientation information included in the response information, in response to outputting the answering voice.

18. The electronic device of claim 12, wherein the at least one processor is configured to synthesize an additional tone as the other output based on at least one of grade information, numerical value information, and orientation information included in the response information, in response to outputting the answering voice.

19. The electronic device of claim 12, wherein the at least one processor is configured to provide multimedia content associated with the response information as the other output in response to outputting the answering voice.

20. An information providing method performed by an electronic device having a voice-based interface, the method comprising:

receiving a voice request from a user through the voice-based interface;

acquiring response information corresponding to the voice request;

outputting the response information in an answering voice that is an auditory output form through at least one of a plurality of pieces of media including a main medium corresponding to the voice-based interface and at least one sub medium included in another electronic device interactable with the electronic device;

analyzing the voice request to determine an information type of the voice request corresponding to a select subject from a plurality of predetermined subjects;

selecting at least one sub medium including an application for outputting information associated with the determined at least one information type based on the determined information type corresponding to the select subject; and providing another output with respect to at least a portion of the response information through the application of the selected at least one sub medium included in said another electronic device.

21. The method of claim 20, wherein the plurality of predetermined subjects includes weather, locations, places, transportations, singers, or movies, and the application includes a map application for providing a map service, a search application for providing a search engine, or a schedule application for providing a schedule management.

* * * * *